(12) United States Patent
Hosch et al.

(10) Patent No.: US 7,874,419 B2
(45) Date of Patent: Jan. 25, 2011

(54) CONTAINED DRIVE SYSTEM FOR CHAIN CONVEYOR BELT TO REDUCE CATENARY SAG

(75) Inventors: Michael A. Hosch, Oconomowoc, WI (US); Paul Hau, Watertown, WI (US)

(73) Assignee: Dorner Mfg. Corp., Hartland, WI (US)

( * ) Notice: Subject to any disclaimer, the term of this patent is extended or adjusted under 35 U.S.C. 154(b) by 20 days.

(21) Appl. No.: 12/175,531

(22) Filed: Jul. 18, 2008

(65) Prior Publication Data

US 2009/0020397 A1 Jan. 22, 2009

Related U.S. Application Data

(60) Provisional application No. 60/950,659, filed on Jul. 19, 2007.

(51) Int. Cl.
*B65G 17/00* (2006.01)

(52) U.S. Cl. ............... 198/841; 198/837; 198/860.1

(58) Field of Classification Search ............... 198/835, 198/837, 840, 841, 860.1, 850, 861.1
See application file for complete search history.

(56) References Cited

U.S. PATENT DOCUMENTS

| | | | |
|---|---|---|---|
| 4,128,164 A | 12/1978 | Sandberg | |
| 4,821,866 A * | 4/1989 | Melgaard | 198/860.1 |
| 4,993,542 A * | 2/1991 | Nomura | 198/841 |
| 4,995,506 A | 2/1991 | Langenbacher et al. | |
| 5,310,047 A | 5/1994 | Ledingham | |
| 5,311,983 A * | 5/1994 | Clopton | 198/860.1 |
| 5,314,059 A | 5/1994 | Clopton | |
| 5,562,202 A | 10/1996 | Newcomb et al. | |
| 5,584,377 A | 12/1996 | Lago | |
| 6,543,609 B2 * | 4/2003 | Layne et al. | 198/837 |
| 6,607,074 B2 * | 8/2003 | Klabisch et al. | 198/834 |
| 6,612,426 B1 | 9/2003 | Guerra et al. | |
| 6,749,059 B2 * | 6/2004 | Gundlach et al. | 198/851 |
| 6,782,997 B2 * | 8/2004 | Abbestam et al. | 198/841 |
| 6,848,572 B1 | 2/2005 | Sisson, Jr. et al. | |
| 6,871,737 B2 | 3/2005 | Ertel et al. | |
| 6,889,824 B2 | 5/2005 | Leisner | |
| 7,090,071 B2 | 8/2006 | Enomoto | |
| 7,131,531 B1 | 11/2006 | Ryan | |
| 7,134,544 B1 | 11/2006 | Kilper et al. | |
| 7,137,506 B2 | 11/2006 | Munoz-Guerra et al. | |
| 7,314,132 B2 * | 1/2008 | Layne et al. | 198/850 |

* cited by examiner

*Primary Examiner*—James R Bidwell
(74) *Attorney, Agent, or Firm*—Andrus, Sceales, Starke & Sawall, LLP

(57) ABSTRACT

A conveyor frame assembly for use with a conveyor belt formed from individual links each joined together at pivot points. The conveyor frame assembly includes a drive assembly that pulls the conveyor belt around a drive roller to transition between the upper and lower runs of the conveyor belt. The drive end includes a support block that encloses the side edges of the conveyor belt as the conveyor belt transitions over the drive sprockets. The side frame members each include a continuous retaining channel having a height greater than the thickness of the conveyor belt. The retaining channels formed on opposite sides of the conveyor frame assembly allow the lower run of the conveyor belt to "tent" by creating an angle between adjacent links of the conveyor belt assembly. The tenting of the lower run of the conveyor belt eliminates catenary sag.

18 Claims, 4 Drawing Sheets

CONTAINED DRIVE SYSTEM FOR CHAIN CONVEYOR BELT TO REDUCE CATENARY SAG

CROSS-REFERENCE TO RELATED APPLICATION

The present application is based on and claims priority to U.S. Provisional Patent Application Ser. No. 60/950,659 filed on Jul. 19, 2007.

BACKGROUND OF THE INVENTION

The present invention generally relates to a conveyor frame assembly for use with a plastic chain conveyor belt. More specifically, the present invention relates to a conveyor assembly that reduces the catenary sag of the lower run of the conveyor belt downstream from the drive roller.

In many conveyor applications, a plastic chain conveyor belt is utilized to move materials throughout a facility. The plastic chain conveyor belt includes individual links that run across the width of the conveyor belt such that the conveyor belt can assume a flat transporting condition yet can transition over both a drive roller and an idler roller to create the upper and lower runs of the conveyor belt.

Since plastic chain conveyor belts can be used to move a large number of products throughout a facility, the weight of the products on the plastic belt and the wear of the belt links cause the belt to "stretch" when the belt is under load. When the belt is placed under a larger load, the "stretching" of the conveyor belt increases the length of the belt, which creates a sag in the lower run of the conveyor belt following the drive roller. This "loop" of chain hangs down immediately following the drive sprockets and is referred to as catenary sag. Since there is nearly zero tension on the chain immediately following the drive sprockets, the lower run of the conveyor belt sags beneath the lowermost edge of the spaced side rails of the conveyor assembly to create the catenary sag.

During conveyor design, the amount of catenary sag is calculated and the conveyor is designed to incorporate the catenary sag. Although the catenary sag allows the conveyor to compensate for the stretching of the conveyor belt under tension, the catenary sag oftentimes extends beneath the lower edge of the conveyor frame assembly. This causes many problems, including allowing the conveyor belt to be contacted by personnel in the area surrounding the conveyor frame assembly and greatly expanding the overall height of the conveyor.

Therefore, a need exists for a conveyor frame assembly that addresses the problems created by the catenary sag beneath the lower edge of the conveyor frame assembly. Further, a need exists for a conveyor assembly that allows for the stretching of the plastic belt while still addressing the catenary sag of the lower run of the conveyor belt.

SUMMARY OF THE INVENTION

The present invention generally relates to a conveyor assembly used in connection with a conveyor belt formed from individual link sections, preferably each made from plastic. More particularly, the invention relates to a conveyor assembly that includes an enclosed area within the side frame members that allows the conveyor assembly to compensate for the stretching of the conveyor belt during use of the conveyor belt with a load.

During use of a conveyor belt under tension, the individual plastic links are pulled, which causes the plastic conveyor belt to stretch and increase in length. Typically, such increase in length is compensated for by a catenary sag in the lower run of the conveyor belt. However, in accordance with the present invention, an enclosed retaining cavity is created within the spaced side frame members that allows the individual links of the conveyor belt to "tent" to take up the increased length in the conveyor belt. The "tenting" of the individual links of the conveyor belt decreases the overall linear length of the conveyor belt, thus compensating for the stretching that occurs during use of the conveyor belt in a loaded condition.

Each side frame member of the conveyor frame assembly includes a retaining cavity having a height greater than the thickness of the conveyor belt. The height of the retaining cavity allows the conveyor belt to tent within the retaining cavity and eliminates the catenary sag of the lower run of the conveyor belt.

BRIEF DESCRIPTION OF THE DRAWINGS

The drawings illustrate the best mode presently contemplated of carrying out the invention. In the drawings.

DETAILED DESCRIPTION OF THE INVENTION

Figure 1:
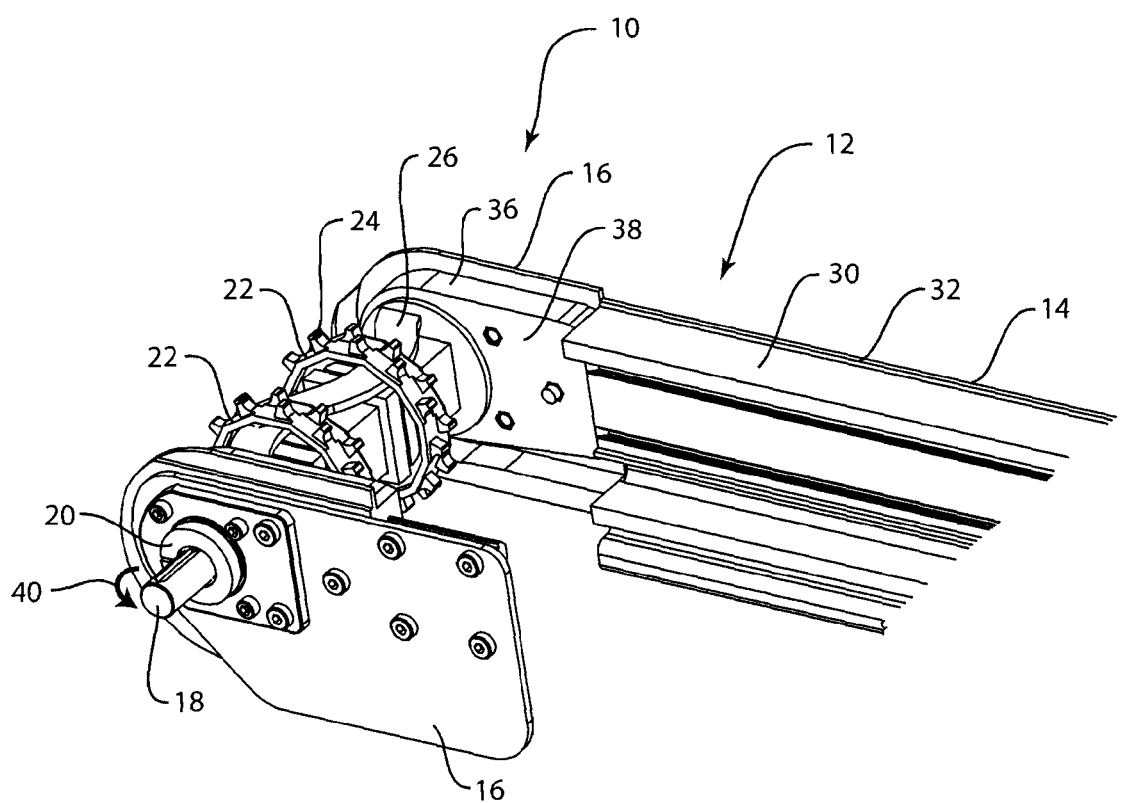
FIG. 1 is a partial perspective view illustrating the drive end of a conveyor assembly with the plastic conveyor belt removed.

FIG. 1 illustrates the drive end 10 of a conveyor assembly 12 including a pair of spaced side frame members 14, of which only one is shown in FIG. 1. The drive end 10 includes a pair of spaced side brackets 16 that are each connected to one of the side frame members 14. The side brackets 16 each rotatably support a drive shaft 18 operatively connected to a drive motor (not shown). In the embodiment shown in FIG. 1, the drive shaft 18 is rotatably supported within a bearing assembly 20 contained in each of the side brackets 16. The drive shaft 18 receives a plurality of drive sprockets 22, each of which include a series of spaced teeth 24 that engage the individual links of a conveyor belt. As shown in FIG. 1, a sprocket connector 26 links the series of drive sprockets 22 to provide the desired spacing of the drive sprockets 22 along the length of the drive shaft 18.

Figure 4:
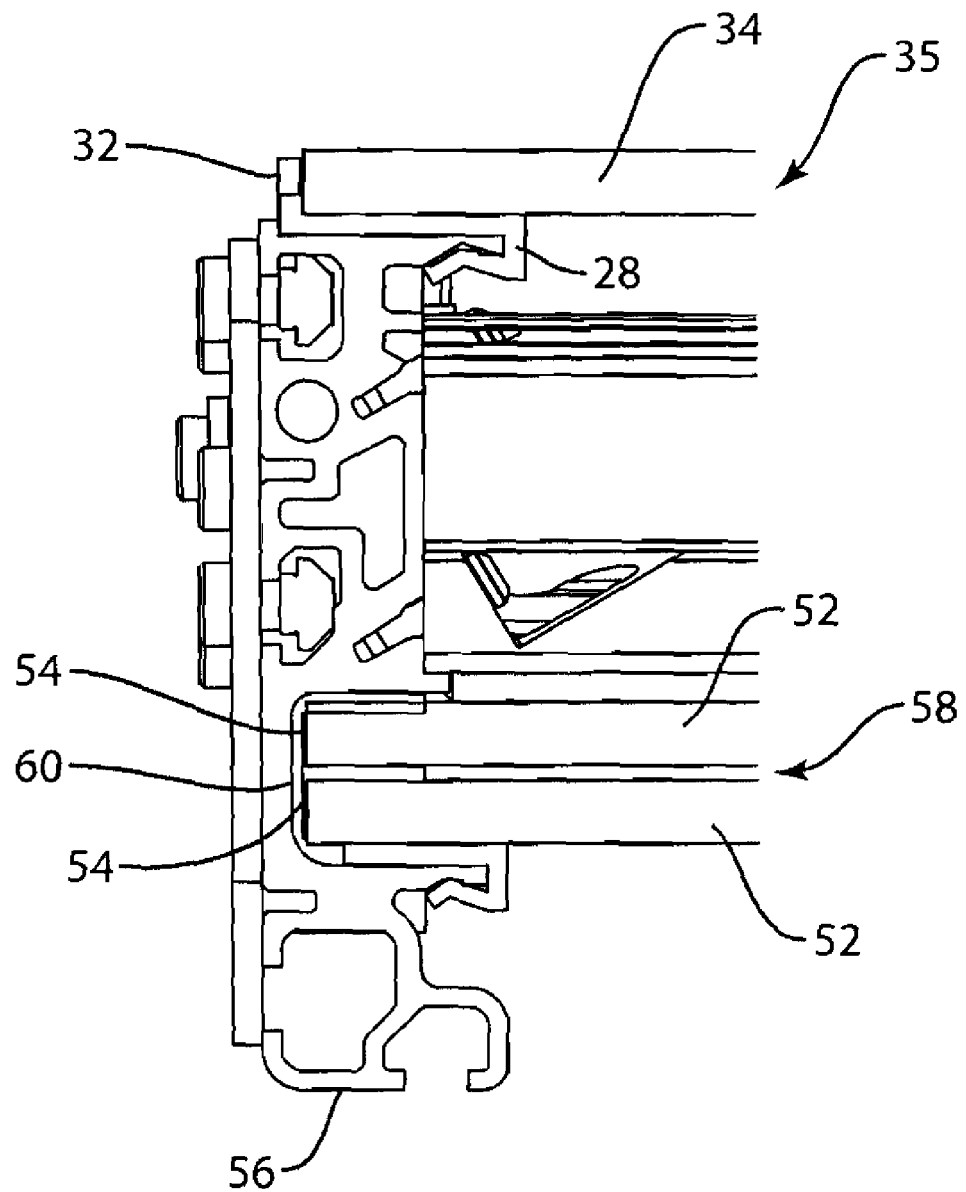
FIG. 4 is a section view illustrating the side frame members and the continuous conveyor belt.
Figure 5:
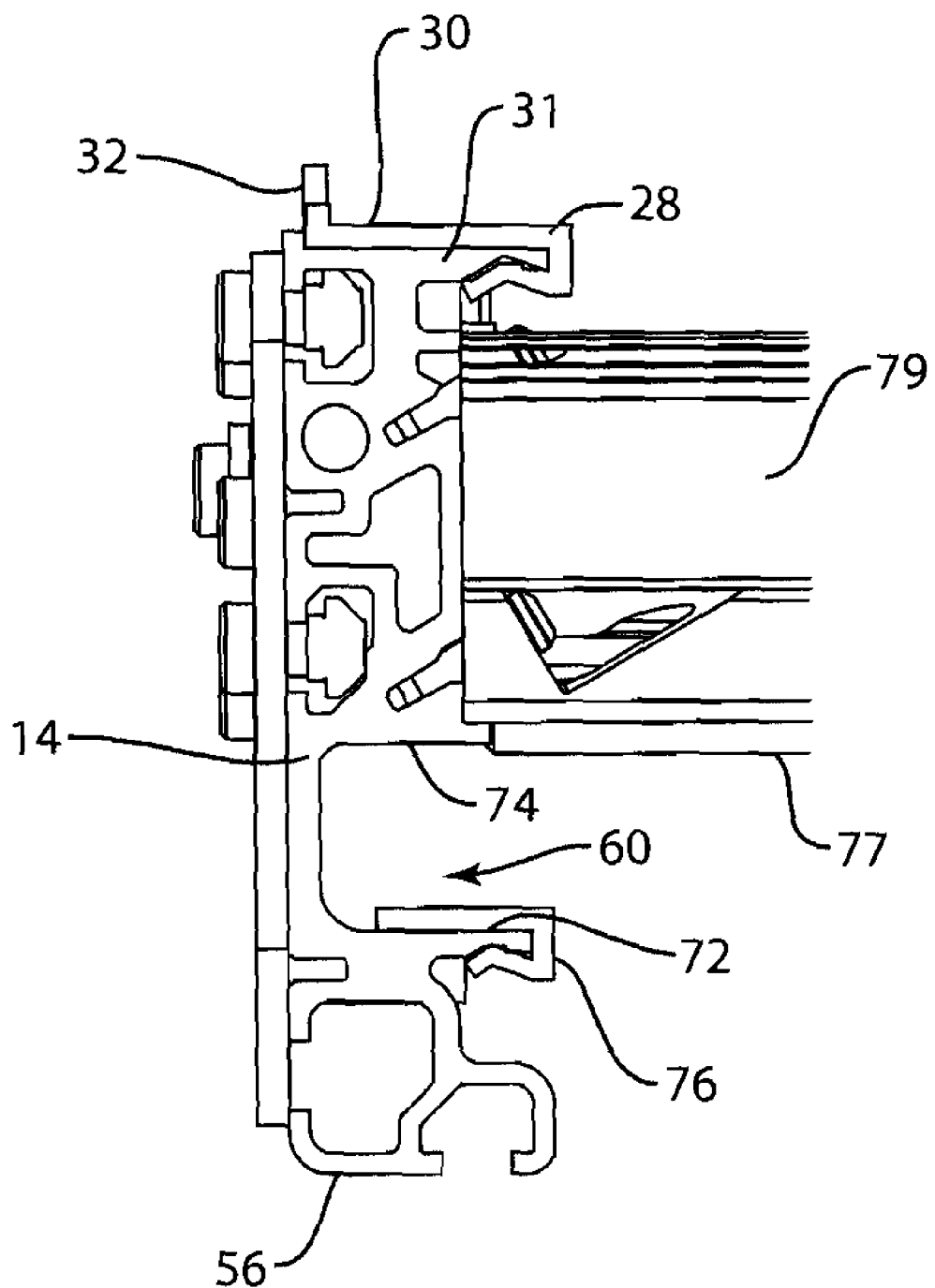
FIG. 5 is a section view similar to FIG. 4 with the conveyor belt removed.

As can best be seen in FIGS. 1 and 5, the side frame member 14 is an extruded aluminum member that includes a top wear member 28 that defines a generally planar belt support surface 30. The top wear member 28 clips onto an upper web 31 of the extruded aluminum profile of the side frame member 14 and is preferably formed from a resilient wear-resistant material, such as UHMW. The top wear member 28 includes an outer lip 32 that restricts the lateral movement of the top run 34 of the conveyor belt 35, as best shown in FIG. 4.

Referring back to FIG. 1, the belt support surface 30 transitions onto a similar belt support surface 36 formed as part of a support block 38 mounted to the inner surface of the side bracket 16. The belt support surface 36 guides the moving conveyor belt into engagement with the plurality of drive sprockets 22 such that the drive shaft 18 can pull the top run of the conveyor belt over the drive shaft. In the embodiment shown in FIG. 1, the drive shaft is rotating in the direction shown by arrow 40.

Figure 2:
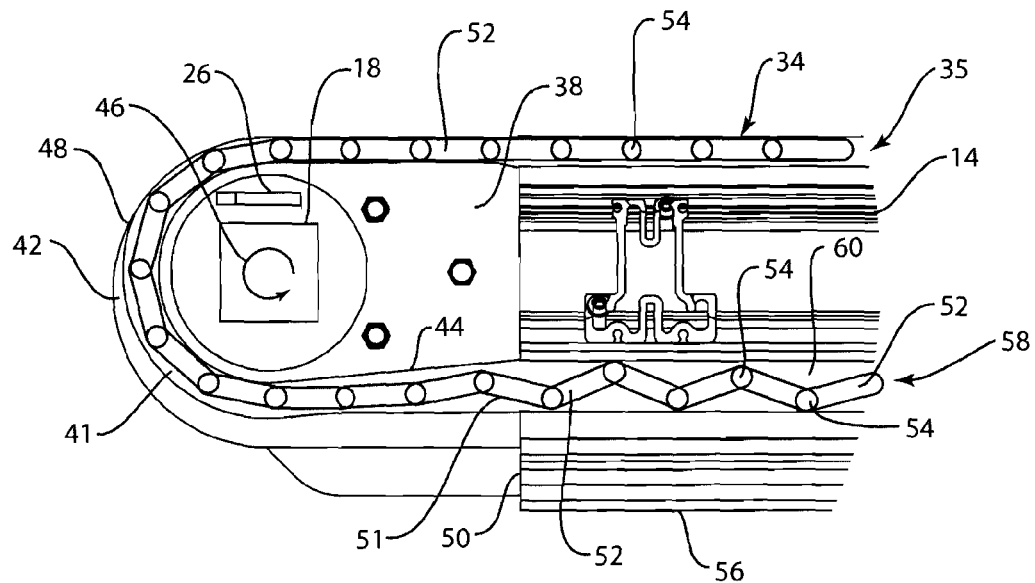
FIG. 2 is a section view of the drive end of the conveyor assembly illustrating the tenting of the plastic chain conveyor belt.

Referring now to FIG. 2, as the top run 34 of the conveyor belt 35 is pulled over the drive sprockets, the side edges of the conveyor belt 35 are each contained within a guide channel 41 formed between the outer guide wall 42 and the inner guide surface 44 of each support block 38. Thus, as the conveyor belt is pulled over the drive sprockets, the side edges of the conveyor belt are contained within the guide channels 41 formed in the support blocks 38 mounted to the inner surface of the side brackets 16. As illustrated in FIG. 2, the outer guide wall 42 increases in thickness around the circumference as the drive shaft 18 rotates in the direction shown by arrow 46. Specifically, the outer guide wall 42 begins at the transition point 48 and continues to the end wall 50 of the support block 38.

As can be seen in FIG. 2, the conveyor belt 35 is comprised of a series of individual links 52 pivotally joined to each other by connecting pins that create pivot points 54 between the links 52. The pivot point 54 between the individual links 52 allow the individual links to pivot relative to each other such that the conveyor belt can transition over the drive sprockets.

As described previously, the plastic chain conveyor belt 35 shown in the Figures stretches as the belt undergoes loading due to products being transported. Since the conveyor frame length is designed for the belt under no load, the stretching of the belt must be compensated for in the design of the conveyor assembly. As previously described, one method of compensating for the increase in length of the conveyor belt is to allow the conveyor belt to create a catenary sag in the lower run of the conveyor belt following the drive sprocket. In past conveyor assemblies, the catenary sag allowed the conveyor belt to sag beneath the lowermost edge 56 of the side frame member.

In the embodiment of the invention shown in FIG. 2, the catenary sag is eliminated by allowing the lower run 58 of the conveyor belt 35 to "tent" within a lower, retaining channel 60 formed as part of the side frame member 14. Throughout the remaining portions of this description, the term "tenting" refers to the ability of the individual links of the conveyor belt to create an angle between the adjacent chain links 52 through the pivoting of the adjacent links about the pivot points 54. As can be appreciated in FIG. 2, the tenting of the conveyor belt reduces the linear length of the conveyor belt relative to a condition in which the individual links are in an end-to-end orientation.

An exit end 51 of the guide channel 41 is aligned with the retaining channel 60 to guide the side edges of the conveyor belt into the retaining channel 60. As illustrated in FIG. 2, when the links 52 tent within the retaining channel 60, the longitudinal axis of each individual link 52 extends at an angle relative to the longitudinal axis of the adjacent link 52 such that the combined length of two adjacent, tented links 52 is significantly less than if the two adjacent links were in horizontal alignment with each other, as is the case in the upper run 34 of the conveyor belt 35. The ability of the conveyor belt to "tent" within the retaining channel 60 reduces the overall length of the lower run 58 of the conveyor belt without utilizing a catenary sag.

The retaining channel 60 is a continuous channel that extends along the entire length of each of the side frame members 14 to prevent the catenary sag anywhere along the entire length of the side frame members 14. The retaining channel thus prevents the lower run of the conveyor belt from extending below the lower edge of the side frame members 14 at any point.

Figure 3:
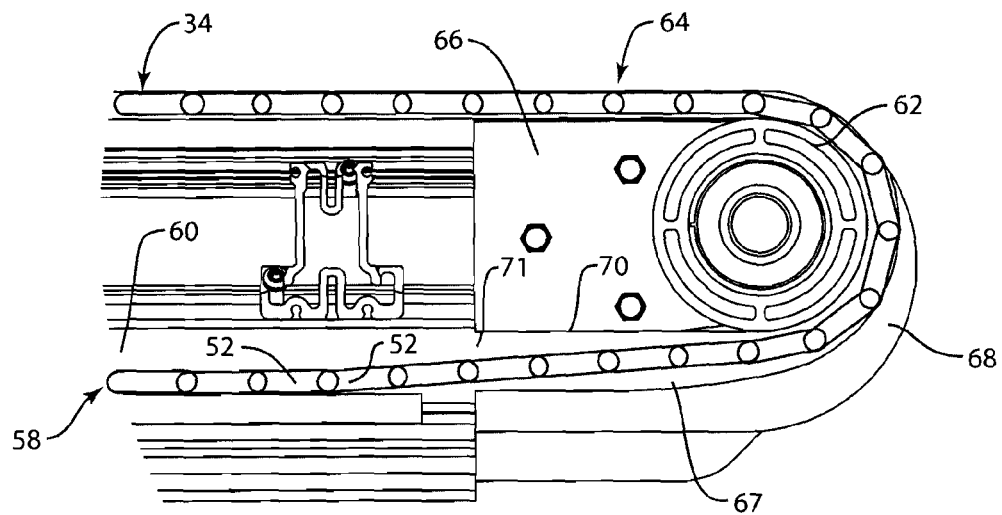
FIG. 3 is a section view of the idler end of the conveyor assembly.

Referring now to FIG. 3, as the lower run 58 of the conveyor belt approaches the idler roller 62, the longitudinal axes of the individual links 52 are again in horizontal alignment with each other, since the top run 34 of the conveyor belt is in tension. As illustrated in FIG. 3, the idler assembly 64 of the conveyor assembly includes a support block 66 that includes a similar guide channel 67 formed between the outer guide wall 68 and an inner guide surface 70. An entrance 71 to the guide channel 67 is aligned with the retaining channel 60 to guide the side edges of the conveyor belt into the guide channel 67. However, since the lower run 58 of the conveyor belt is under tension, the individual links are no longer tented and are horizontally aligned, as illustrated in FIG. 3.

Referring now to FIG. 5, the retaining channel 60 in the side frame member 14 is defined between the lower support surface 72 and a top wall 74. The lower support surface 72 receives a bottom wear member 76 preferably formed from a durable material, such as UHMW. Referring now to FIG. 4, the height of the retaining channel 60 preferably is sufficient to allow the lower run 58 of the conveyor belt to significantly tent. The height of the retaining channel 60 is determined by the ratio of the thickness of the conveyor belt to the length of the individual links to permit an adequate amount of tenting of the conveyor belt downstream from the drive sprockets. It is contemplated that the height of the retaining channel 60 must be limited to prevent the conveyor chain from binding within the retaining channel 60.

As illustrated in the embodiment shown in FIG. 2, the pivot points 54 between the pair of chain links 52 are spaced vertically from each other as the conveyor belt tents within the retaining channel 60. The height of the retaining channel 60 limits the amount of tenting within the retaining channel 60 to restrict possible binding as the lower run of the conveyor belt travels along the length of the conveyor assembly. The height of the retaining channel 60 permits the desired tenting of the lower run of the conveyor belt. An increase or a decrease in the height of the retaining channel 60 will result in a shortening or lengthening of the overall length of the conveyor assembly in which the tenting takes place. The desired height of the retaining channel 60 is determined as a ratio of the thickness of the conveyor belt and the length of each of the individual links. As illustrated in FIG. 3, as the lower run of the conveyor belt approaches the idler end 64, the tension within the conveyor belt eliminate the tenting before the conveyor belt reaches the idler roller 62.

In the embodiment of the invention shown, the conveyor assembly includes a series of wear strips 77 that extend lengthwise between the cross supports 79. The wear strips 77 are formed from a durable material, such as UHMW, that contacts the moving conveyor belt to limit the amount of tenting of the conveyor links. Preferably, the wear strips 77 extend only near the drive end of the conveyor assembly since the tenting of the conveyor belt occurs only near the drive end.

As can be understood in FIG. 2, the use of the retaining channel 60 within the side frame member 14 completely encloses the lower run of the conveyor belt and eliminates the need for catenary sag. The height of the retaining channel 60 allows the lower run of the conveyor belt to "tent" to allow for expansion of the conveyor belt during use and during loading. Further, the support block 38 encloses the conveyor belt around the drive sprocket to further aid in driving of the conveyor belt and help eliminate the need for a catenary sag.

We claim:

1. A conveyor assembly comprising:

a continuous conveyor belt having a width defined by a pair of spaced side edges and formed from a plurality of links joined to each other, wherein each of the plurality of links is pivotally connected to a pair of adjacent links;

a pair of spaced side frame members that form a conveyor frame for supporting an upper run and a lower run of the conveyor belt;

a drive assembly mounted to a first end of the side frame members for driving the conveyor belt; and an idler assembly mounted to the second end of the side frame member to idler the lower run of the conveyor belt to the upper run of the conveyor belt, wherein each of the side frame members includes a retaining channel having a height greater than the thickness of the conveyor belt, wherein the entire height of the retaining channel is open to an interior of the conveyor frame to receive and retain one of the side edges of the lower run of the conveyor belt, wherein the plurality of links of the lower run of the conveyor belt can pivot relative to each other within the retaining channel to reduce the linear length of the lower run of the conveyor belt.

2. The conveyor assembly of claim 1 wherein the height of the retaining channel is defined by an upper guide surface and a lower support surface formed in each of the spaced side frame members.

3. The conveyor assembly of claim 1 wherein the retaining channel is formed in the side frame member above a lower edge of the side frame member, wherein the retaining channel receives one of the side edges of the lower run of the conveyor belt to support the side edge of the conveyor belt above the lower edge of the side frame member.

4. The conveyor assembly of claim 1 wherein the drive assembly includes a pair of spaced support blocks each having a guide channel formed therein, wherein the guide channels each receive one of the side edges of the conveyor belt as the conveyor belt transitions from the upper run to the lower run.

5. The conveyor assembly of claim 4 wherein an exit end of the guide channel is aligned with the retaining channel formed in the side frame member.

6. The conveyor assembly of claim 1 wherein the idler assembly includes a pair of spaced support blocks each having a guide channel formed therein, wherein the guide channels of the idler assembly each receive one of the side edges of the conveyor belt as the conveyor belt transitions from the lower run to the upper run.

7. The conveyor assembly of claim 4 wherein the idler assembly includes a pair of spaced support blocks each having a guide channel formed therein, wherein the guide channels of the idler assembly and the guide channel of the drive assembly are in communication with the continuous retaining channel formed in the side frame members.

8. The conveyor assembly of claim 1 wherein the height of the retaining channel is determined by the thickness of the conveyor belt and the length of the chain links.

9. A conveyor assembly for use with a continuous conveyor belt having a belt thickness, a width defined by a pair of side edges and a plurality of links pivotally joined to each other, comprising:

a pair of spaced side frame members that form a conveyor frame for supporting an upper run and a lower run of the conveyor belt;

a drive assembly mounted to a first end of the side frame members for driving the conveyor belt; and an idler assembly mounted to a second end of the side frame members to idler the lower run of the conveyor belt to the upper run of the conveyor belt, wherein each of the side frame members includes a continuous retaining channel open to an interior of the conveyor frame to receive and retain one of the first and second side edges of the lower run of the conveyor belt, wherein the retaining channel has a height greater than the thickness of the conveyor belt such that the plurality of links of the conveyor belt can pivot relative to each other within the retaining channel wherein the entire height of the retaining channel is o)en to the interior of the conveyor frame.

10. The conveyor assembly of claim 9 wherein the height of the retaining channel is determined by the thickness of the conveyor belt and the length of the chain links.

11. The conveyor assembly of claim 9 wherein the drive assembly includes a pair of spaced support blocks each having a guide channel formed therein, wherein the guide channels each receive one of the side edges of the conveyor belt as the conveyor belt transitions from the upper run to the lower run.

12. The conveyor assembly of claim 11 wherein an exit end of the guide channel is aligned with the retaining channel formed in the side frame member.

13. The conveyor assembly of claim 9 wherein the idler assembly includes a pair of spaced support blocks each having a guide channel formed therein, wherein the guide channels are aligned with the retaining channels to receive one of the side edges of the conveyor belt as the conveyor belt transitions from the upper run to the lower run.

14. The conveyor assembly of claim 9 wherein the height of the retaining channel is defined by an upper guide surface and a lower support surface formed in each of the spaced side frame members.

15. The conveyor assembly of claim 9 wherein the retaining cavity channel is formed in the side frame member above a lower edge of the side frame member, wherein the retaining cavity receives one of the side edges of the lower run of the conveyor belt to support the side edge of the conveyor belt above the lower edge of the side frame member.

16. The conveyor assembly of claim 15 wherein the height of the retaining channel is determined by the thickness of the conveyor belt and the length of the chain links.

17. A conveyor assembly comprising:

a continuous conveyor belt having a pair of side edges and formed from a plurality of links pivotally joined to each other, wherein each of the links are pivotally movable relative to a pair of adjacent links;

a pair of spaced side frame members that form a conveyor frame for supporting an upper run and a lower run of the conveyor belt;

a drive assembly mounted to a first end of the side frame members for driving the conveyor belt, the drive assembly including a pair of spaced support blocks each having a guide channel that receives one of the side edges of the conveyor belt as the conveyor belt transitions from the upper run to the lower run;

an idler assembly mounted to a second end of the side frame members to idler the lower run of the conveyor belt to the upper run of the conveyor belt, wherein the idler assembly includes a pair of spaced support blocks each having a guide channel that receives one of the side edges of the conveyor belt as the conveyor belt transitions from the lower run to the upper run, wherein each of the side frame members includes a continuous retaining channel in communication with both the guide channel formed in the drive assembly and the guide channel formed in the idler assembly, wherein the retaining channel is open to an interior of the conveyor frame to support one of the side edges of the lower run of the conveyor, wherein the retaining channel has a height greater than a thickness of the conveyor belt and the entire height of the retaining channel is open to the interior of the conveyor frame such that the links of the conveyor belt are pivotable relative to each other while supported within the retaining channel.

18. The conveyor assembly of claim 17 wherein the retaining channel is formed in the side frame members above a lower edge of the side frame member, wherein the retaining channel receives one of the side edges of the lower run of the conveyor belt to support the side edge of the lower run of the conveyor belt above the lower edge of the side frame member.

\* \* \* \* \*